US005250962A

United States Patent [19]

Fisher et al.

[11] Patent Number: 5,250,962

[45] Date of Patent: Oct. 5, 1993

[54] MOVABLE INK JET PRIMING STATION

[75] Inventors: Almon P. Fisher, Rochester; Herman A. Hermanson, Penfield, both of N.Y.

[73] Assignee: Xerox Corporation, Stamford, Conn.

[21] Appl. No.: 777,043

[22] Filed: Oct. 16, 1991

[51] Int. Cl.[5] .................... G01D 15/16; G01D 15/18

[52] U.S. Cl. .................... 346/140 R; 346/75

[58] Field of Search .................... 346/140 R, 75

[56] References Cited

U.S. PATENT DOCUMENTS

| | | | |
|---|---|---|---|
| 4,362,572 | 12/1982 | Wallace | 134/18 |
| 4,567,494 | 1/1986 | Taylor | 346/140 R |
| 4,833,491 | 5/1989 | Rezanka | 346/140 R |
| 4,881,085 | 11/1989 | Gibson et al. | 346/75 |
| 4,947,191 | 8/1990 | Nozawa et al. | 346/140 R |
| 4,952,947 | 8/1990 | Kyoshima | 346/140 R |
| 5,040,000 | 8/1991 | Yokoi | 346/140 R |
| 5,051,761 | 9/1991 | Fisher et al. | 346/140 R |
| 5,055,856 | 10/1991 | Tommii et al. | 346/1.1 |

*Primary Examiner*—Benjamin R. Fuller
*Assistant Examiner*—Eric Frahm
*Attorney, Agent, or Firm*—Oliff & Berridge

[57] ABSTRACT

A movable priming station, for use with an ink jet printer having a printhead with a linear extended array of nozzles located on a planar surface thereof, is capable of priming a portion of the extended array of nozzles at one time by applying a vacuum to at least one nozzle located on the portion of the extended array. The movable priming station includes a support capable of moving along a length of the extended array of nozzles, a vacuum tube attached to the support for movement with the support and having a vacuum port adjacent to one end thereof. The support is controlled so that the vacuum port does not contact a nozzle-containing surface of the printhead when the support is moved laterally along the linear array of nozzles. The vacuum port can be maintained a predetermined distance, greater than zero, from the planar surface of the printhead by the support so that when the support is moved along the length of the extended array of nozzles while the support contacts the printhead, the vacuum port is located closely adjacent to without contacting the nozzle-containing portion of the printhead. Alternatively, the support can be moved away from the printhead during lateral movement thereof so as not to slide along the printhead.

24 Claims, 4 Drawing Sheets

MOVABLE INK JET PRIMING STATION

BACKGROUND OF THE INVENTION

1. Field of the Invention

The present invention relates to ink jet printers and, more particularly, to priming stations for priming and cleaning nozzles of an ink jet printhead.

2. Description of Related Art

Ink jet printers usually include one or more extended arrays of nozzles contained on a planar surface of a printhead. Droplets of ink are ejected from the nozzles and controllably directed toward a recording medium (e.g., paper) to print images thereon. Droplet formation can be controlled by, for example, piezoelectric transducers or resistive heating elements as is well known in the art. See, for example, U.S. Pat. Nos. 4,463,359 to Ayata et al; 4,789,425 to Drake et al; 4,638,328 to Drake et al; and 4,601,777 to Hawkins et al, the disclosures of which are incorporated herein by reference.

The nozzles are formed, for example, by etching a plurality of channels in one surface of a first silicon wafer, which is then adhesively bonded to another silicon wafer. The bonded silicon wafers are then diced along a line perpendicular to and intersecting the channels to form a planar surface (or front face) of the printhead, which contains an extended linear array of nozzles (corresponding in number to the number of channels formed in the first wafer). See, for example, U.S. Pat. Nos. 4,878,992 to Campanelli; 4,851,371 to Fisher et al; 4,829,324 to Drake et al; Re. 32,572 to Hawkins et al; and 4,774,530 to Hawkins, the disclosures of which are incorporated herein by reference.

In order to eject droplets consistently (i.e., having a consistent size and ejection direction), the planar surface of the printhead which contains the nozzles (and, particularly, the portion of that planar surface where the nozzles are located) must be maintained smooth and scratch-free. Any scratches on the front face of the printhead in the vicinity of a nozzle can interfere with the formation of an ink meniscus at that nozzle, causing drop misdirection. Additionally, the nozzle containing surface of the printhead is frequently treated with a coating which is non-wettable by the ink. The non-wettable coating prevents ink from adhering to the planar, nozzle-containing surface of the printhead, which adhered ink can also interfere with the ejection of new droplets from the nozzles.

The processes which make these printheads result in nozzles having sharp edges. These sharp edges assist in the meniscus formation process, but also increase the probability of contamination building-up in the nozzles because these sharp edges tend to shear small pieces from wiping blades (which are used to remove excess ink from the front face, particularly after priming), which pieces then collect in the nozzles.

Air can become ingested into the channels which supply ink to the nozzles during operation of the printhead. This air disrupts the operation of those nozzles and is typically removed by priming. Priming can also be used to remove dirt from the printhead nozzles. Dirt accumulates due to the close proximity of the printhead to the paper (which releases dust and particles), as well as due to the presence of airborne dust and particles. Additionally, as discussed above, when wiping blades are used to wipe residual droplets from the planar nozzle-containing surface of the printhead, the sharp edges of the nozzles slice small pieces from the wiping blades, which further clog the nozzles.

A number of procedures are known for priming printheads with fresh ink. Pressure can be applied to the ink supply to force ink out through the nozzles. Alternatively, suction can be applied to all of the nozzles in the printhead to draw ink simultaneously through all the channels. As another alternative, suction can be applied to a lesser number of nozzles (i.e., not all of the nozzles) at a time through one or more tubes or small diameter hoses.

Of these methods, the use of a single tube or hose is preferable because: a) suction is better than pressure for removing air inside the ink jet reservoirs; and b) application of suction to all of the nozzles in the printhead, while being effective for drawing a vacuum through all of the nozzles and removing air, does not function well at removing dirt from the nozzles. The use of a single small diameter tube to apply vacuum to a lesser number of nozzles at one time concentrates the vacuum in that lesser number of nozzles, allowing greater flow through the channels than would occur when applying suction to all of the nozzles at one time. Additionally, the present inventors have found that positioning a small diameter tube closely adjacent to, yet spaced away from, a nozzle-containing front face of the printhead removes more dirt by drawing in air located adjacent to the front face, as well as ink located in the channels. Accordingly, as compared to a single small diameter tube, a cleaning device which applies vacuum to all nozzles at the same time does not apply a force which is sufficient to adequately remove dirt from the nozzles. Additionally, much of the vacuum is lost through the large sealing surface of priming members which suction all nozzles at once. Furthermore, priming stations which suction all nozzles at once tend to leave ink on the front face of the printheads, which ink must be removed, for example, by wiping blades. As discussed above, minute pieces of blade material are cut from the wiping blades by the nozzles, contributing to recontamination of the nozzles.

U.S. Pat. No. 4,947,191 to Nozawa et al discloses an ink jet recording apparatus having an ink jet head provided with plural discharge openings and a partial capping member for covering a part of the plural discharge openings and applying suction only to the covered part of the plural discharge openings. The partial capping member is provided on a belt which is moved across the nozzles of the printhead to selectively locate the partial capping member adjacent to a small number of nozzles. The capping member of Nozawa et al contacts the printhead face along the array of nozzles and is moved along the array of nozzles. The capping member of Nozawa et al could scratch the printhead surface, as well as remove any coating material therefrom. The present invention differs from Nozawa et al at least in that the present invention provides a priming station which does not contact the areas of the printhead containing the nozzles and/or does not slide a priming member along the nozzle-containing surface of the printhead.

U.S. Pat. No. 4,567,494 to Taylor discloses a nozzle cleaning, priming, and capping apparatus for thermal ink jet printers. The cleaning, priming and capping apparatus includes an elastomeric suction cup which engages the printhead during a cleaning, priming or capping operation. The present invention differs from Taylor at least in that the priming station of the present invention does not contact and/or slide along the nozzle-containing surface of the printhead, and also does not prime all nozzles at one time.

U.S. Pat. No. 4,833,491 to Rezanka discloses multiple priming units for contacting multiple printheads on a multi-color carriage-type printer. Each purging unit includes tubing which is placed in air-tight position over the nozzles for application of vacuum thereto. The present invention differs from Rezanka at least in that the priming station of the present invention applies a vacuum to less than all of the nozzles in an array at one time.

U.S. Pat. No. 5,051,761 to Almon Fisher et al, the disclosure of which is incorporated herein by reference, discloses a sliding priming station for priming a small number of nozzles at one time in a pagewidth ink jet printhead. This priming station is located inside a belt or drum (platen) and accesses the printhead by moving through an aperture in the belt or drum. This patent does not disclose an arrangement where a sliding priming station does not contact and/or slide along the nozzle-containing portion of a printhead.

OBJECTS AND SUMMARY OF THE INVENTION

It is an object of the present invention to provide a station for cleaning and priming a small number of nozzles of ink jet printheads while providing a high vacuum capable of removing air and contaminants from the nozzles.

It is another object of the present invention to provide a vacuum-type priming station for an ink jet printer which can maintain a vacuum port at a predetermined distance spaced from, yet closely adjacent to, the nozzles to prevent contact of the vacuum port with the nozzles, thereby avoiding clogging or damage to the nozzles or to the vacuum port.

It is another object of the present invention to provide a priming station for an ink jet printer which is movable along a length of an array of nozzles on a printhead for selectively priming a small number of nozzles without scratching or removing coatings from crucial portions of the printhead.

To achieve the foregoing and other objects, and to overcome the shortcomings discussed above, an ink jet priming station is provided which applies a vacuum to a small number of nozzles of a printhead (having a large number of nozzles) without contacting and/or sliding along a nozzle-containing portion of the printhead. The priming station comprises a vacuum line in communication with a vacuum source at one end thereof, and having a vacuum port at its opposite end. The vacuum port is sized to correspond to a small number of (e.g., one or a few) ink jet nozzles at one time. The vacuum port is preferably supported closely adjacent to, yet spaced away from, the nozzles of the printhead.

A support having protrusions which contact a portion of a front face of the printhead spaced away from the nozzles maintains the vacuum port a precise predetermined distance away from the nozzles, preferably without contacting the portion of the printhead containing the nozzles. The predetermined distance is dependent on the size of the vacuum port and the amount of vacuum supplied by the vacuum source. By spacing the vacuum port from the nozzles, and only contacting the printhead with the protrusions along areas spaced away from the nozzles, the priming station can slide along the array of nozzles, priming and cleaning the nozzles, one or a few at a time, without contacting or scratching the portion of the printhead containing the nozzles.

In one preferred embodiment, the protrusions of the support physically maintain the vacuum port spaced away from the nozzle containing portions of the printhead, and are maintained in contact with the printhead as the support is laterally moved along the array of printhead nozzles. Alternatively, the support is moved away from the printhead when the support is being laterally moved between nozzles, and is only contacted with the printhead when lateral movement is stopped. With this alternative type of motion, it may be possible to contact the vacuum port with the nozzle-containing portion of the printhead so as to provide a better seal between the vacuum port and primed nozzles, if such contact does not damage the nozzle-containing portion of the printhead. With this alternative type of motion, where the vacuum port contacts the printhead, the support does not require protrusions.

Instead of using a protrusion to physically contact the printhead and maintain the vacuum port spaced from the nozzles, it is also possible to electronically control the movement of the support so that it does not contact the printhead.

The present invention is not limited to a linear array of nozzles; it could equally apply to two-dimensional arrays of nozzles such as, for example, a multi-color full width array printer and could be easily modified for such use by allowing relative movement of the priming station perpendicular to the length of the array, as well as parallel to the array.

DETAILED DESCRIPTION OF THE PREFERRED EMBODIMENTS

Figure 1:
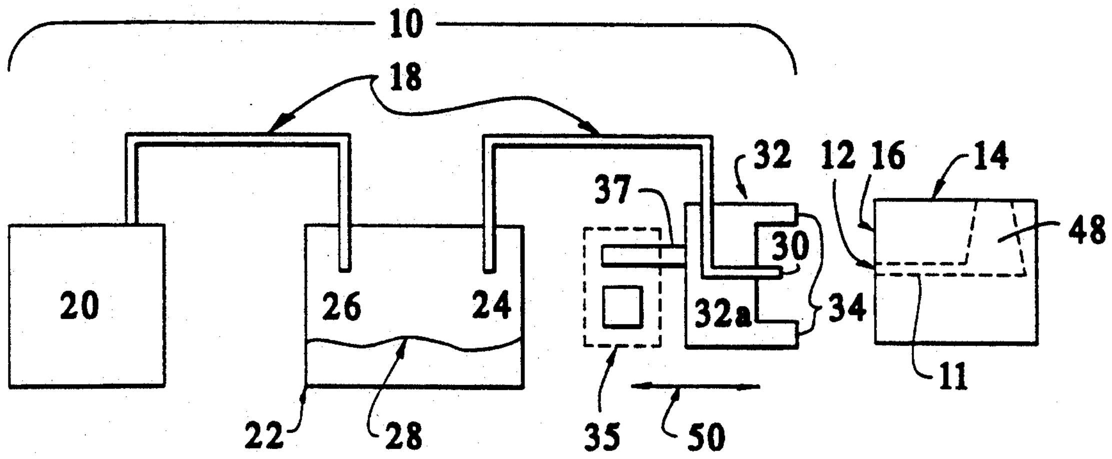
FIG. 1 is a side view of a priming station according to one embodiment of the present invention.

With reference to FIG. 1, there is shown an ink jet priming station 10 which can be used to prime a portion of a linear array of nozzles of a printhead 14. The terminology "portion", as used herein refers to a small number of nozzles (e.g., one or a few) out of the large number of total nozzles which are contained in the printhead. Printhead 14 is mounted in a thermal ink jet printer 15 (see FIG. 6A), the general construction of which is well known in the art. The nozzles 12 are located on a front face 16 of the printhead 14 and are arranged in a linear array (see FIG. 4). The front face 16 usually includes a non-wettable coating which prevents ink from adhering to the nozzle-containing front face as described above. The nozzles are outlets of channels 11 which extend through the printhead 14 and communicate with ink reservoirs 48.

The priming station of the present invention is particularly useful in printers containing pagewidth ink jet printheads because, as described above, it is difficult to readily apply large amounts of vacuum to all the nozzles in a pagewidth printhead without using an exceptionally large vacuum source. However, the present invention is also useful in ink jet printers having printheads smaller in size than a pagewidth, since even in small printheads (which, for example, can be mounted on a movable carriage) it is desirable to apply a high vacuum to only one or a few of the nozzles at one time so as to remove contaminants therefrom.

Figure 2:
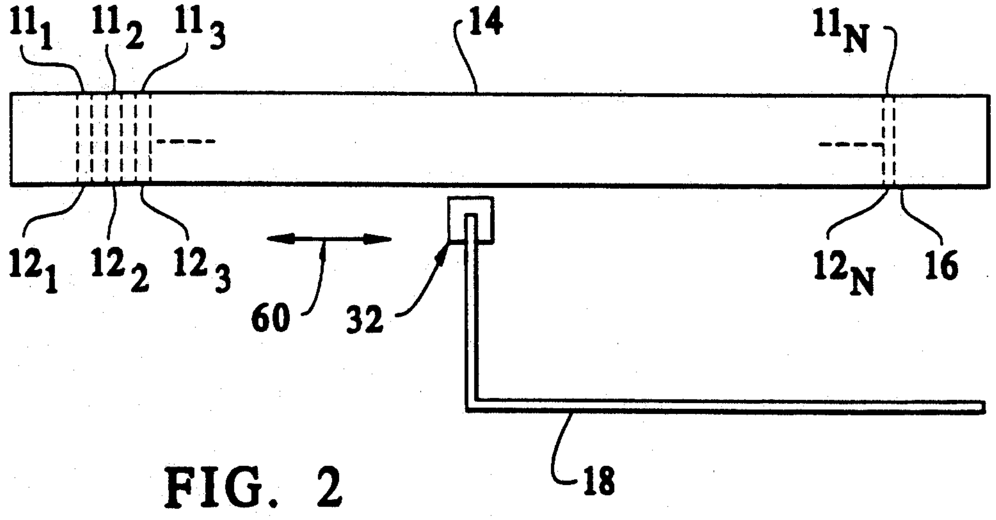
FIG. 2 is a partial top view of the printhead and the priming station of FIG. 1.

FIG. 2 is a top view of a pagewidth printhead 14. The pagewidth printhead has a plurality of channels $11_1$, $11_2$, $11_3$, . . . $11_N$, each having a corresponding nozzle $12_1$, $12_2$, $12_3$, . . . $12_N$ located on the nozzle-containing front face 16 thereof.

The ink jet priming station of FIG. 1 includes vacuum tubing 18 which is in direct communication at one end thereof with a vacuum source 20. The other end of the vacuum tube 18 has a vacuum port 30 which is maintained closely adjacent to the nozzles 12 during priming. The vacuum source 20 can be of various sizes, so long as it provides vacuum sufficient to remove air and contaminants from individual nozzles 12 of the printhead 14. A suitable vacuum source, particularly when applying vacuum to only one nozzle at a time, is a small fish tank pump converted to draw vacuum. Such a pump works well when vacuum port 30 is maintained closely adjacent to the nozzles, i.e., within a few mils. Between the ends of the vacuum tubing 18 is an ink trap 22 which is a sealed receptacle having an inlet 24 and an outlet 26 through which vacuum tubing 18 is connected. The trap 22 is used to catch and store any ink 28 which passes through tubing 18 during priming operations. This ink can be filtered and re-used, or discarded.

In a preferred embodiment, the vacuum port 30 is physically maintained a predetermined distance from the nozzles of the printhead 14 by a support 32. The vacuum port 30 is attached to a main body portion 32*a* of the support 32 via tubing 18, preferably so that the vacuum port 30 extends outwardly beyond a front side of the main body portion 32*a* of support 32. Accordingly, in this embodiment, the vacuum port 30 is located closer to the nozzles 12 than the main body portion 32*a* of the support 32. Main body portion 32*a* can also be referred to as the priming portion of support 32 since it includes vacuum port 30.

Preferably, the support 32 includes at least one protrusion 34 which extends past the vacuum port 30 by a predetermined distance G, toward the printhead nozzles. Preferably, this predetermined distance G is no greater than about 10 mils. At least one protrusion is provided when the vacuum port is to be physically maintained spaced away from the nozzles.

Figure 3:
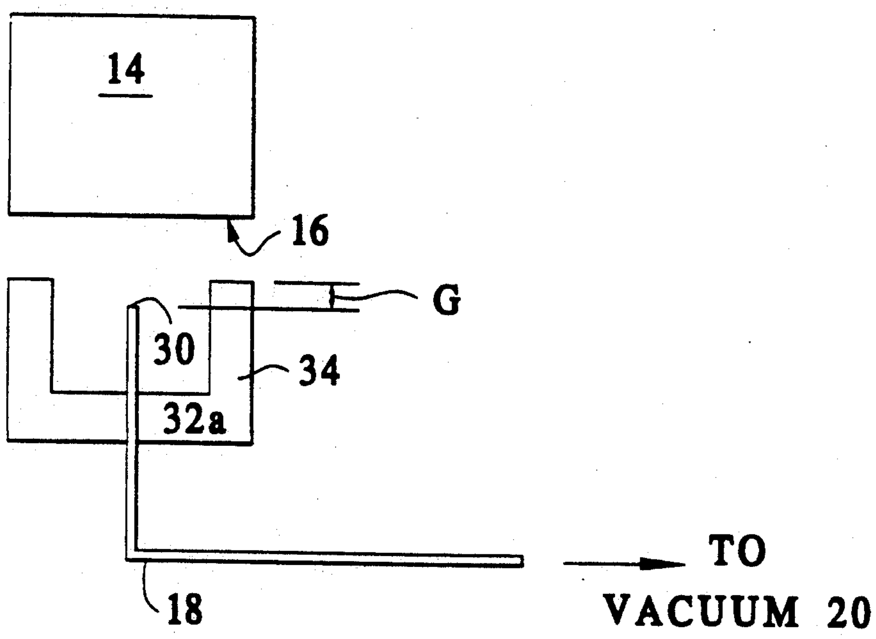
FIG. 3 is an enlarged side view of the priming station of FIG. 1, indicating the manner in which the vacuum port on a vacuum line is maintained spaced away from the printhead.

FIGS. 1 and 3 illustrate a support 32 having two protrusions 34, one above and one below both the vacuum port 30 and the linear array of nozzles 12. The use of two protrusions 34 provides a stable structure for maintaining the vacuum port the predetermined distance G from the nozzles. The support 32 containing the two protrusions 34 is horse-shoe shaped, and thus is sometimes referred to as an alignment shoe. The protrusions 34 are contact portions of the support since they contact the front face 16 of the printhead 14 along areas spaced sufficiently far away from the nozzle-containing portion of the front face 16, so as not to damage the critical areas of the front face (those areas directly surrounding nozzles 12), even if the support 32 is laterally moved along the printhead 14 parallel to the array of nozzles (see arrow 60 in FIG. 2) while the protrusions 34 are in contact with the front face 16. The protrusions 34 ensure a proper minimum spacing between the vacuum port 30 and the nozzles 12 so that the vacuum port will not engage directly with the nozzles, possibly damaging the nozzle-containing portion of surface 16 of the printhead and diminishing drop placement accuracy.

Figure 4:
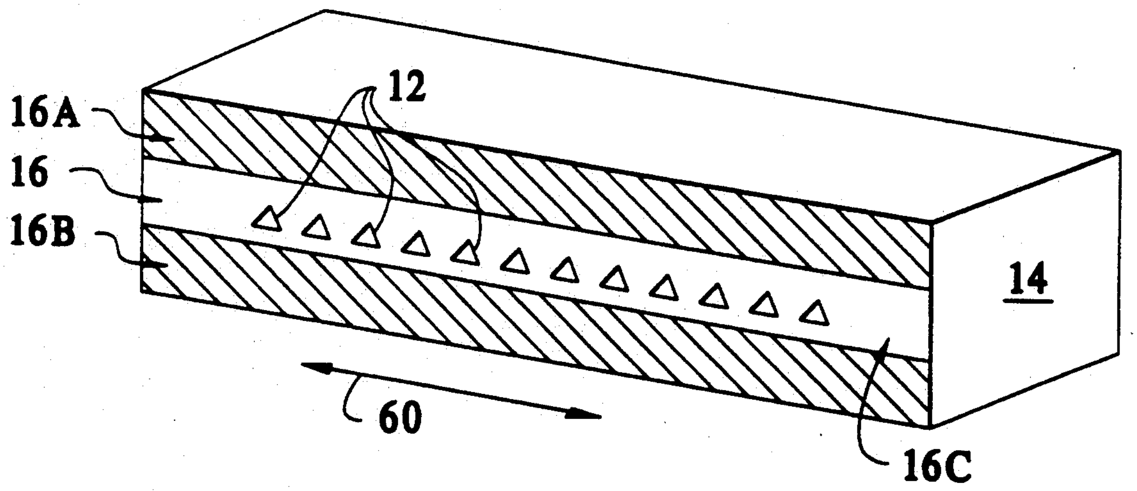
FIG. 4 is a perspective view of the nozzle-containing front face of the printhead containing an array of nozzles, with the cross-hatched regions illustrating portions of the nozzle-containing face which can be contacted without affecting the printing quality of the printhead.

FIG. 4 is a perspective view of a printhead nozzle-containing face 16, with the portions of the front face 16 which are contacted by protrusions 34 shown as cross-hatched. Specifically, portions 16A and 16B are portions of the front face which can be contacted by the support 32, even when the support is being moved along the printhead in direction 60 without adversely affecting the drop directionality of the printhead. Portion 16C of front face 16 contains nozzles 12, and therefore should not be contacted by support 32, at least when support 32 is being moved laterally along the direction indicated by arrow 60. It is possible to contact protrusions 34 with structures other than front face 16 of printhead 14. For example, the protrusions could contact the heat sink upon which the printhead is mounted. An advantage of contacting the front face 16 of printhead 14, is that the nozzles are always precisely located relative to the front face 16 (i.e., the nozzles 12 are in the same plane as the front face 16). Additionally, the support can be constructed to have a small size when it contacts the printhead (that is, support 32 has a height about the same as the printhead height).

The vacuum port 30 is sized to correspond to one or a few printhead nozzles 12 at one time. According to one embodiment of the present invention, the port 30 is sized to prime a single nozzle at a time. Alternatively, if a larger vacuum source 20 is used, or if the vacuum port is located close enough to, or possibly in contact with, the front face 16 of the printhead, the port size may be larger to encompass more than one nozzle at a time. The advantages of a small port 30 are a greater ink flow through the individual ink channels 11 than was previously achieved when drawing through all channels at once, and the ability to use a smaller vacuum source. In fact, the use of a small vacuum source to apply vacuum to only a small number of nozzles results in the application of higher vacuum forces to the primed nozzles than could previously be achieved with priming stations that applied vacuum to all nozzles in a pagewidth printhead at one time (even if large vacuum sources were used). Moreover, when the tip 30 of tube 18 is located a small distance away from front face 16, dirt is removed from the front face as well as from within the nozzle-defining channels 11.

Figure 5A:
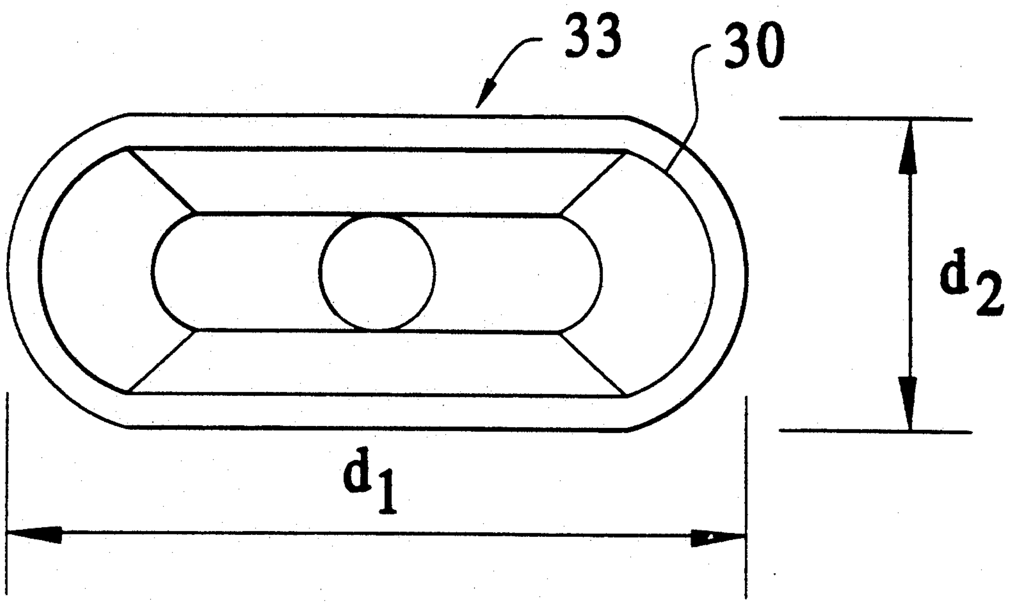
FIG. 5A is an end view of one suction nozzle that can be used with the priming station of the present invention.
Figure 5B:
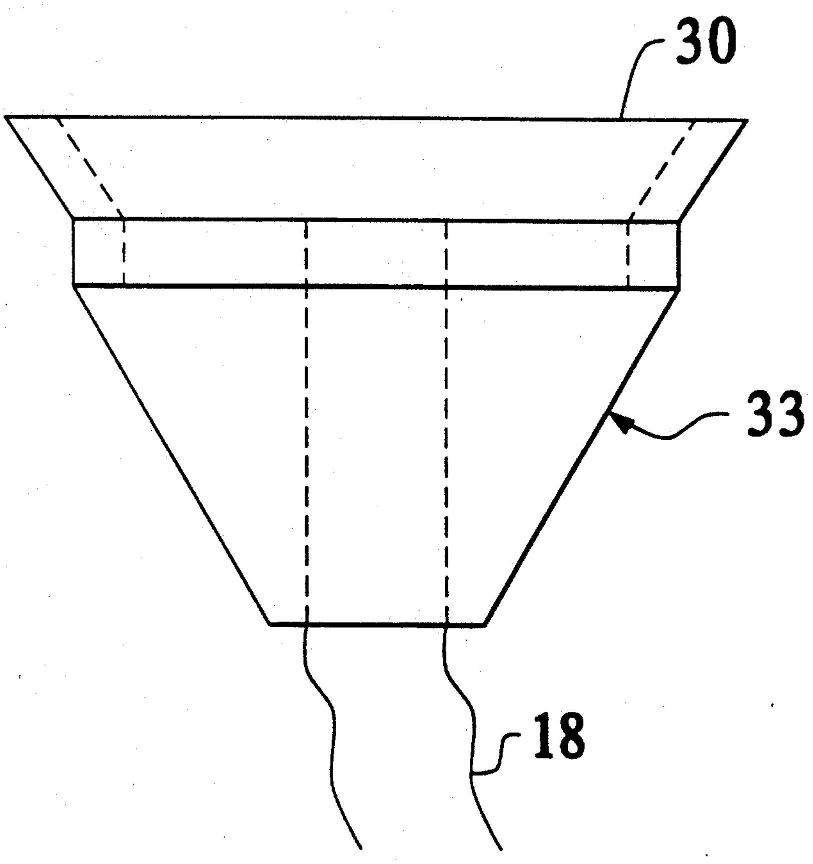
FIG. 5B is a top view of the suction nozzle of FIG. 5A.

As shown in FIGS. 5A and 5B, the vacuum port 30 can be provided on a suction tip 33, and can be oval shaped. The oval port 30 has a first diameter $d_1$ which is preferably 2 to 4 nozzle widths long and a second diameter $d_2$ which is substantially the height of the nozzles. For example, the diameter $d_1$ can be sufficient to prime three nozzles at one time. Configuration of the vacuum port as described allows cleaning of a few adjacent nozzles simultaneously while still maintaining a substantially high vacuum through the tube to ensure that all contaminants and air are expelled from the nozzles 12. The oval vacuum port 30 requires a stronger vacuum source than a vacuum port which is substantially the same size as a single nozzle for similar vacuum port-/nozzle spacings G in order to apply the same amount of vacuum to each individual nozzle.

It is also possible to provide a support having a vacuum port that is flush with the forward-most portion thereof (for example where G=O, or where no protrusions are provided and the vacuum tubing does not extend beyond the main body portion 32*a* of the support) as long as the support is prevented from being moved laterally along the printhead front face 16 while the support is in contact therewith. For example, the support could be maintained spaced away from the nozzle-containing portion of the printhead by purely electronic means (as opposed to the illustrated physical means for spacing). For example, a servo motor could be used to precisely control the position of support 32 along the direction indicated by arrow 50 in FIG. 1. Alternatively, the vacuum port may be permitted to contact the nozzle-containing portion 16C of the printhead as long as the support 32 is not moved laterally (along line 60) while the vacuum port is in contact with the nozzle-containing portion. In this alternative embodiment, the support merely needs to be moved away from the printhead (leftward along arrow 50 in FIG. 1) prior to laterally moving support 32.

Figure 6A:
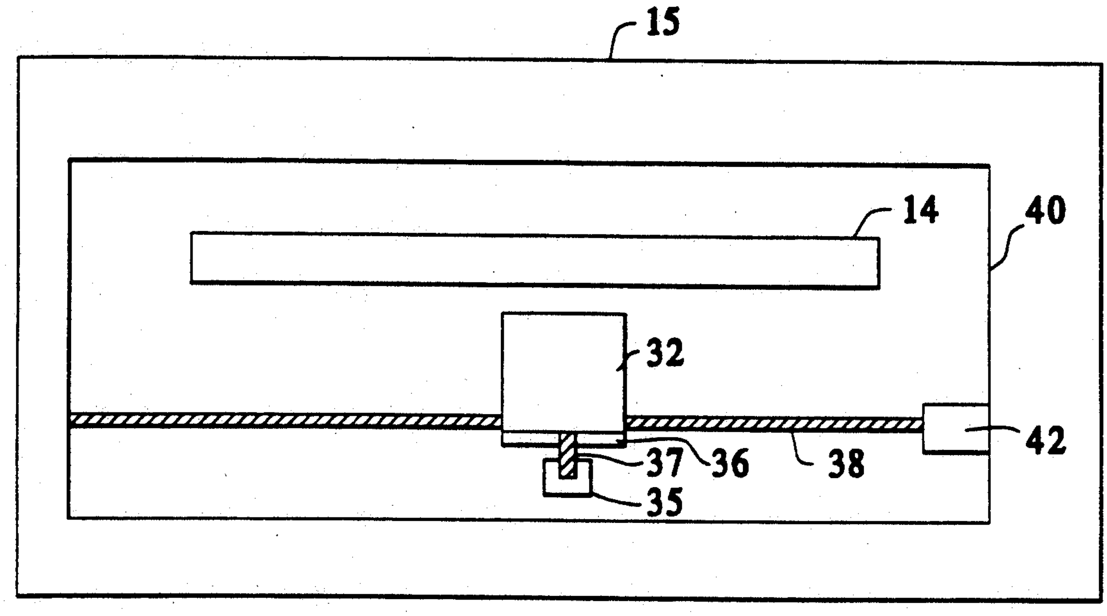
FIG. 6A is a top view of one mechanism for laterally moving the priming station along the printhead.
Figure 6B:
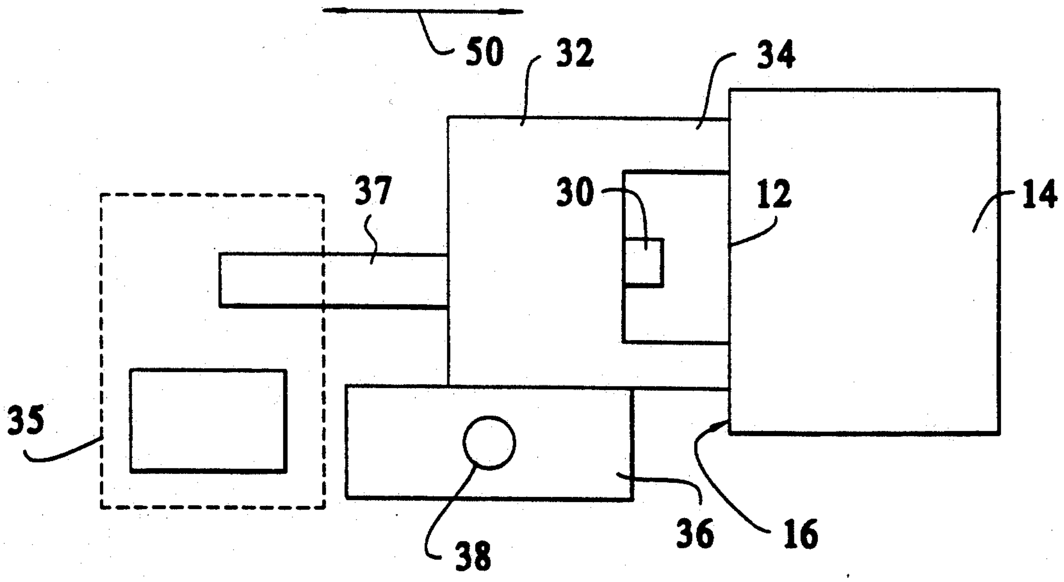
FIG. 6B is a side view of the priming station and another moving mechanism placing the priming station in an active priming position.

The priming station 10 can also include a carriage 36, as shown in FIGS. 6A and 6B, upon which support 32 is mounted. Carriage 36 is driven by suitable lateral moving means such as a motor 42 mounted in housing 40 of printer 15 to linearly drive the carriage 36 and support 32 parallel to the linear array of nozzles 12 on printhead 14. In the illustrated embodiment, the support 32 is movable along a line parallel to the printhead nozzles by motor 42 which drives a linkage such as a helically grooved shaft 38. Carriage 36 is mounted on the shaft 38 so that rotation of the shaft 38 causes lateral movement of the carriage 36 along the printhead 14. The lateral moving means may be automatically controlled to position the support 32 at precise locations adjacent to nozzles which are sensed to require priming. The printer may include a node which at start-up causes the lateral drive means to position the vacuum port 30 adjacent to each nozzle, progressively, for performing priming and cleaning operations on all nozzles in turn. Alternatively, the shaft 38 may be smooth and the carriage assembly 36 free to travel along the shaft such that movement of the support 32 along the printhead can be controlled manually by an operator to select locations. Of course, other linear moving arrangements, such as, for example, a carriage mounted on a belt, could be used.

As mentioned above, the support 32 can also be movable toward and away from the printhead 14 so as to locate the vacuum port 30 adjacent to or spaced away from the nozzles 12. Specifically, a moving means can be provided for selectively moving the support 32 between a standby position spaced away from the printhead and an active position closely adjacent to the printhead. According to one embodiment of the present invention, the moving means is a solenoid 35 which is connected to the support 32 by way of linkage 37. The support 32 is mounted on carriage 36 for movement in the directions indicated by arrow 50. When power is applied to solenoid 35, linkage 37 moves support 32 to the right (as shown in FIGS. 1 and 6B) until stopped by contact of protrusions 34 with front face 16. At this time, vacuum port 30 is located the predetermined distance G ($O \leqq G \leqq = 10$ mils) from the nozzle-containing portion 16C of printhead 14. When power is removed from solenoid 35, support moves leftward to return to its retracted position. As stated earlier, support 32 can be moved laterally along printhead 14 while the solenoid is activated as long as G is greater than zero. However, it may be desirable to always retract support 32 away from printhead 14 whenever support 32 is laterally moved, even when $G > O$, in order to avoid damage to any portion of the front face 16 of printhead 14.

Of course, other mechanisms can be provided for selectively maintaining the support closely adjacent to or spaced away from the printhead. For example a servo motor could be used. Additionally, the support could be spring biased toward the printhead, and engageable with a locking mechanism to lock the support in a position spaced away from the printhead. The locking mechanism could then be manually engaged and disengaged by an operator.

One way to semi-automatically control the priming station would be to provide a software package that automatically moves the priming station adjacent to appropriate nozzles based upon user input information. For example, the printer could be activated to print a test pattern on a sheet of paper. This same test pattern would also be displayed on the screen of a monitor. An operator could then identify portions of the test pattern on the monitor screen (using, for example, a keyboard- or mouse-controlled curser) corresponding to poorly printed portions of the printed test pattern. The software would then determine which nozzles printed the poorer quality image portions, and would move the priming station to the appropriate position for priming those nozzles.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Additionally, the priming station of the present invention can be incorporated into a multi-function maintenance station, such as disclosed in the above incorporated U.S. Pat. No. 5,051,761 to Fisher et al. Various changes may be made without departing from the spirit and scope of the invention as defined in the following claims.

What is claimed is:

1. An ink jet printer comprising:

a printhead having a linear array of nozzles located on a planar surface of said printhead, said linear array of nozzles extending in a line parallel to said planar surface; and a movable priming station capable of priming a portion of said linear array of nozzles at one time by applying a vacuum to at least one nozzle located on said portion of said linear array, said movable priming station including:

a support capable of moving parallel with said line of nozzles;

a vacuum tube attached to said support for movement with said support, said vacuum tube including a vacuum port located at one end thereof, said vacuum port being maintained a predetermined distance, greater than zero, from said planar surface of said printhead by said support;

means for moving said support parallel to said line of nozzles so that said vacuum port is located closely adjacent to said at least one nozzle in a selected portion of said extended array for applying a vacuum to said at least one nozzle;

wherein said support of said movable priming station contacts said planar surface only at an area spaced perpendicularly away from said line of nozzles, when said at least one nozzle is having a vacuum applied thereto.

2. The printer of claim 1, wherein said vacuum port is opposed to and primes a single nozzle in said array of nozzles at one time.

3. The printer of claim 1, wherein said one end of said vacuum tube includes a suction nozzle defining said vacuum port, said vacuum port being oval shaped and having a long diameter which extends across a plurality of nozzles in said array of nozzles so that said plurality of nozzles are primed at one time.

4. The printer of claim 1, wherein said one end of said vacuum tube protrudes outwardly from a priming portion of said support toward said printhead so that said vacuum port is located closer to said linear array of nozzles than said priming portion of said support.

5. The printer of claim 1, wherein said linear array of nozzles has a length equal to a width of a page so that said printhead is a pagewidth printhead.

6. The printer of claim 5, further comprising:

means for selectively moving said support toward and away from said printhead, to place said vacuum port closely adjacent to and spaced away from said printhead, respectively, so that said vacuum port is located said predetermined distance from said printhead when located closely adjacent thereto, and is located a distance greater than said predetermined distance from said printhead when located spaced away therefrom, said selectively moving means moving said support toward said printhead for performing a priming operation and away from said printhead between priming operations.

7. The printer of claim 1, wherein said predetermined distance is no greater than 10 mil.

8. An ink jet printer comprising:

a printhead having a linear array of nozzles extending in a line parallel to and located on a planar surface of said printhead; and a movable priming station capable of priming a portion of said linear array of nozzles at one time by applying a vacuum to said nozzles, said movable priming station including:

a support engageable with said printhead planar surface, said support having a slidable contact portion which only contacts an area of said printhead planar surface spaced perpendicularly away from said line containing said linear array of nozzles when said support is engaged with said printhead, said support also having a priming portion opposed to and spaced a distance away from said portion of said extended array of nozzles when said contact portion is engaged with said printhead;

a vacuum port attached to said priming portion of said support for applying a vacuum to said portion of said extended array of nozzles; and means for moving said support across said planar surface parallel to said line of nozzles so that selected nozzles in said linear array can be primed by said means for applying a vacuum, said slidable contact portion remaining in contact with said planar surface during said moving;

wherein said movable priming station, including said slidable contact portion, does not contact said linear array of nozzles during movement of said support and when said support is not moving.

9. The printer of claim 8, wherein said vacuum port is located at an end of a vacuum tube, said vacuum tube being attached to said support and extending outwardly from said priming portion of said support toward said printhead for a distance less than a length of said contact portion so that when said contact portion contacts said area of said printhead planar surface, said vacuum port is spaced a predetermined distance from said portion of said extended array of printhead nozzles.

10. The printer of claim 8, wherein said vacuum port is opposed to and primes a single nozzle in said linear array of nozzles at one time.

11. The printer of claim 8, further comprising a suction nozzle attached to said priming portion of said support, said suction nozzle defining said vacuum port, said vacuum port being oval shaped and having a long diameter which extends across a plurality of nozzles in said array of nozzles so that said plurality of nozzles are primed at one time.

12. The printer of claim 9, wherein said predetermined distance is 10 mil.

13. An ink jet printer comprising:

a printhead having a linear extended array of nozzles located on a planar surface of said printhead; and a sliding priming station capable of priming a portion of said extended array of nozzles at one time by applying a vacuum to said nozzles, said sliding priming station including:

an alignment shoe, movably engageable with said planar surface of said printhead, said alignment shoe including a main body portion and at least one protrusion extending outwardly from said main body portion and opposed to said printhead planar surface, said at least one protrusion only contacting an area of said printhead planar surface perpendicularly spaced away from said linear extended array of nozzles when said alignment shoe is engaged with said printhead so as to space said main body portion a distance from said printhead planar surface;

a vacuum port attached to said main body portion for applying a vacuum to said portion of said extended array of nozzles;

means for applying a vacuum to said vacuum port; and means for sliding said alignment shoe along said planar surface parallel to said linear extended array of nozzles so that selected nozzles in said extended array can be primed by said means for applying a vacuum;

wherein said priming station does not contact said linear extended array of nozzles.

14. The printer of claim 13, wherein said sliding priming station further comprises:

means for selectively moving said alignment shoe toward and away from said printhead so that said protrusion of said alignment shoe contacts said area of said printhead planar surface spaced perpendicularly away from said extended array of nozzles when said portion of said extended array is to be primed, and moves said alignment shoe away from said printhead planar surface when said means for sliding moves said alignment shoe parallel to said extended array.

15. The printer of claim 13, wherein said vacuum port is located at an end of a vacuum tube, said vacuum tube being attached to said main body portion of said alignment shoe and extending outwardly from said main body portion substantially parallel to said at least one protrusion for a distance less than a length of said at least one protrusion so that when said at least one protrusion contacts said area of said printhead planar surface spaced away from said extended array of nozzles, said vacuum port is spaced a predetermined distance from said portion of said extended array of printhead nozzles.

16. The printer of claim 13, wherein said vacuum port is opposed to and primes a single nozzle in said extended array of nozzles at one time.

17. The printer of claim 13, wherein said vacuum port is oval in shape and located at an end of a suction nozzle attached to said main body portion, said oval vacuum port having a long diameter which extends across a plurality of nozzles in said array of nozzles so that said plurality of nozzles are primed at one time.

18. The printer of claim 15, wherein said predetermined distance is no greater than 10 mil.

19. The printer of claim 13, wherein said linear array of nozzles has a length equal to a width of a page so that said printhead is a pagewidth printhead.

20. An ink jet printer comprising:

a printhead having a linear extended array of nozzles located on a planar surface of said printhead; and a movable priming station capable of priming a portion of said extended array of nozzles at one time by applying a vacuum to at least one nozzle located on said portion of said extended array, said movable priming station including:

a support capable of moving parallel to said linear extended array of nozzles;

a vacuum port attached to said support for movement with said support;

means for providing a vacuum to said vacuum port;

means for moving said support parallel to said linear extended array of nozzles so that said vacuum port is located closely adjacent to said at least one nozzle in a selected portion of said extended array for applying a vacuum to said at least one nozzle; and means for selectively moving said support toward and away from said printhead, to place said vacuum port closely adjacent to and spaced away from said printhead, respectively, wherein said means for moving said support parallel to said linear extended array only moves said support along said extended array of nozzles when said means for selectively moving has moved said support away from said printhead, and said priming station does not contact said linear extended array of nozzles when said support is located closely adjacent to and when said support is located spaced away from said printhead.

21. The printer of claim 20, wherein said means for selectively moving said support maintains said vacuum port a predetermined distance greater than zero, spaced away from said printhead, when said support is located closely adjacent to said printhead.

22. The printer of claim 21, wherein said predetermined distance is no greater than 10 mil.

23. The printer of claim 21, wherein said support includes at least one protrusion extending outwardly from a side of said support containing said vacuum port, said at least one protrusion contacting an area of the printhead planar surface spaced away from said extended array of nozzles when said support is moved closely adjacent to said printhead by said means for selectively moving, so as to maintain said vacuum port spaced said predetermined distance away from said printhead.

24. An ink jet printer comprising:

a printhead having a linear array of nozzles located on a planar surface of said printhead, said linear array extending in a line parallel to said planar surface; and a movable priming station capable of priming a portion of said extended array of nozzles at one time by applying a vacuum to at least one nozzle located on said portion of said extended array, said movable priming station including:

a support capable of moving parallel to said line of nozzles, said support including at least one protrusion extending outwardly from a side of said support, said at least one protrusion only contacting an area of said planar surface spaced perpendicularly away from said line of nozzles;

a vacuum port attached to said side of said support for movement with said support, said vacuum port being spaced a predetermined distance greater than zero away from said planar surface of said printhead by said at least one protrusion;

means for providing a vacuum to said vacuum port; and means for moving said support parallel with said line of nozzles so that said vacuum port is located closely adjacent to said at least one nozzle in a selected portion of said extended array for applying a vacuum to said at least one nozzle.

* * * * *